United States Patent

[11] 3,579,084

[72] Inventor Elmo E. Moyer
 Saratoga Springs, N.Y.
[21] Appl. No. 856,570
[22] Filed Sept. 10, 1969
[45] Patented May 18, 1971
[73] Assignee Atto Laboratories, Inc.
 Rhinebeck, N.Y.

[54] FERRO-RESONANT POWER DEVICE
 4 Claims, 16 Drawing Figs.
[52] U.S. Cl. .................................................. 321/16,
 321/25, 323/44, 336/69
[51] Int. Cl. ...................................................... H02m 7/06,
 G05f 3/06, H01f 15/14
[50] Field of Search .......................................... 321/16, 18,
 25; 323/44, 88; 336/69, 70, (Inquired)

[56] References Cited
 UNITED STATES PATENTS
2,521,513  9/1950  Gray .............................. 323/44
3,371,263  2/1968  Waltz et al. ................... 321/25
  FOREIGN PATENTS
 194,945  7/1968  U.S.S.R. ......................... 336/69

Primary Examiner—William H. Beha, Jr.
Attorney—F. J. Pisarra

ABSTRACT: This invention is directed to an integrated ferroresonant stabilizer having a regulated constant voltage output and in which the secondary windings, of foil interleaved with a dielectric film, provide both inductance and capacitance. A high degree of electrical efficiency is achieved, together with low weight and volume. No external capacitance is required.

Patented May 18, 1971

INVENTOR.
ELMO E. MOYER
BY F. J. Pisarra
ATTORNEY

INVENTOR.
ELMO E. MOYER
BY
F. J. Pisarra
ATTORNEY

Patented May 18, 1971

INVENTOR.
ELMO E. MOYER
BY
F. J. Pisarra
ATTORNEY

INVENTOR.
ELMO E. MOYER
BY
F. J. Pisarra
ATTORNEY

FERRO-RESONANT POWER DEVICE

This invention relates generally to new and useful improvements in transformers and particularly seeks to provide a novel ferroresonant stabilizer that is capable of maintaining average values of output voltage at the required substantially constant level under varying operating conditions and which is substantially smaller in size and weight and of much improved electrical efficiency than prior known ferroresonant devices.

In general, such devices should be capable of delivering regulated constant average value of voltage to the rectifying elements of a DC power supply and should have a high degree of reliability without substantial performance degradation as a function of real time in service and should be so constructed as to attain material economy without diminution of operating efficiency.

Heretofore, such devices, in their simplest forms, have generally consisted of a high leakage reactance ferroresonant transformer with an external "resonant" capacitor connected across the outputs, which necessarily required relatively heavy and bulky constructions.

More recently, as in U.S. Pat. No. 2,521,513, it has been proposed to provide both inductance and capacitance in a single unit including a coil wound around a magnetic core and comprising a plurality of turns of metallic foil interleaved with a corresponding number of turns of a dielectric film.

The ferroresonant devices of this invention, while employing some of the principles of the coil construction of said U.S. Pat. No. 2,521,513, represent substantial improvements thereover in that the improved circuitry enables a relatively constant voltage DC output to be supplied from a varying AC power source, and are so constructed as to be both smaller and lighter and more efficient than any other known such devices for any given set of operating conditions.

The matter of size and weight reduction of these power devices is of substantial importance where they are to be used to supply regulated power to electronic computers where the trend is constantly toward miniaturization of the computers, while the power supplies therefor have not been correspondingly minaturized. For example, in a so-called first generation computer using vacuum tubes the bulk and weight that the power supply therefor represented was only about 4 percent by volume, 10 percent by weight and 3 percent of the dollar value of the entire system. This is in contrast with a fourth generation computer using integrated circuits where existing types of power supplies represent about 50 percent by volume, 60—70 percent by weight and 30 percent of the dollar value of the entire system. Accordingly, any reduction that can be made to the actual bulk, weight, and cost and efficiency of such power devices without affecting their ability to deliver the required power under any given set of operating conditions would be most desirable.

Ferroresonant power devices constructed in accordance with this invention meet such requirements.

Therefore, an object of this invention is to provide a relatively compact, lightweight, low-cost ferroresonant power device that can deliver a regulated constant voltage, under a predetermined set of operating conditions, to a load also operating under a predetermined set of conditions.

Another object of this invention is to provide a ferroresonant device of the character stated in which both inductance and capacitance are provided in a single unit including a composite metallic foil-dielectric film coil wound around a magnetic core, and in which certain of the turns are interconnected to establish an "electrical shear."

With these and other objects, the nature of which will be apparent, the invention will be more fully understood by reference to the drawings, the accompanying detailed description and the appended claims.

Figure 6:
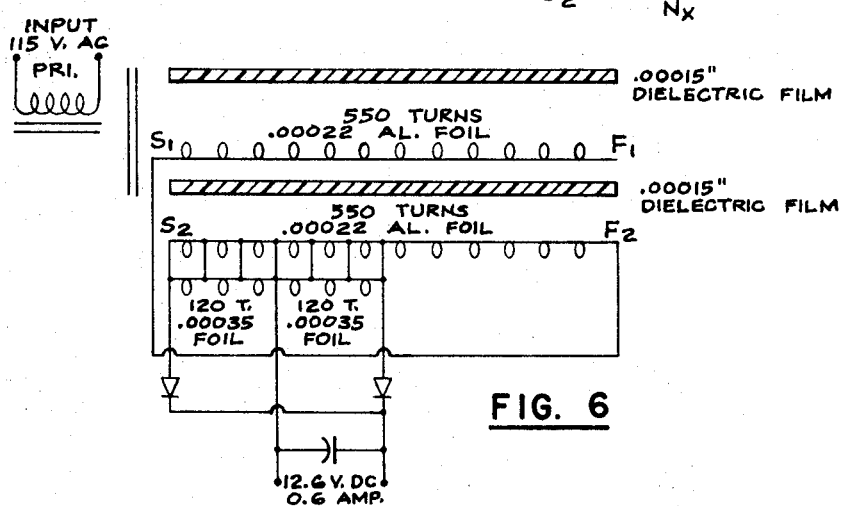
FIG. 6 is a schematic wiring diagram showing the use of only a portion of one foil as a load section.
Figure 7:
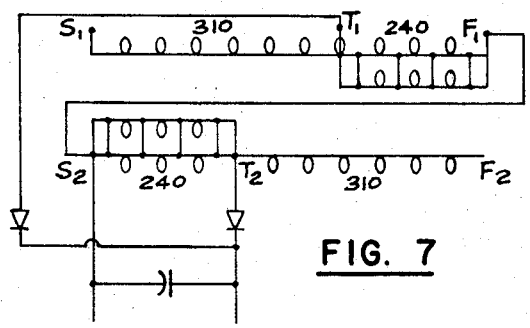
Figure 6A:
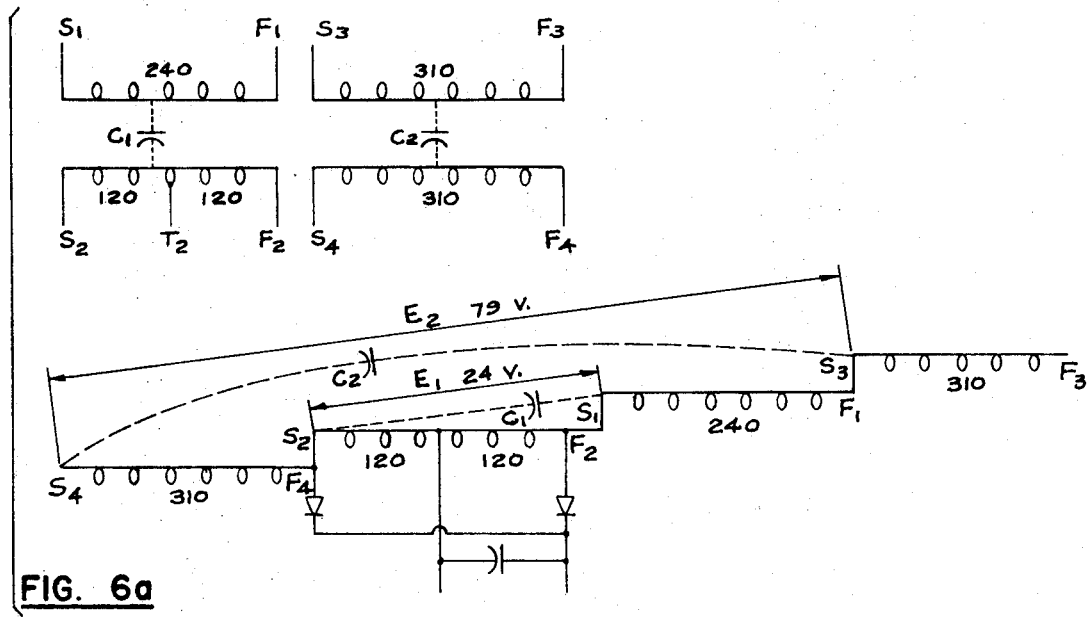
Figure 6B:
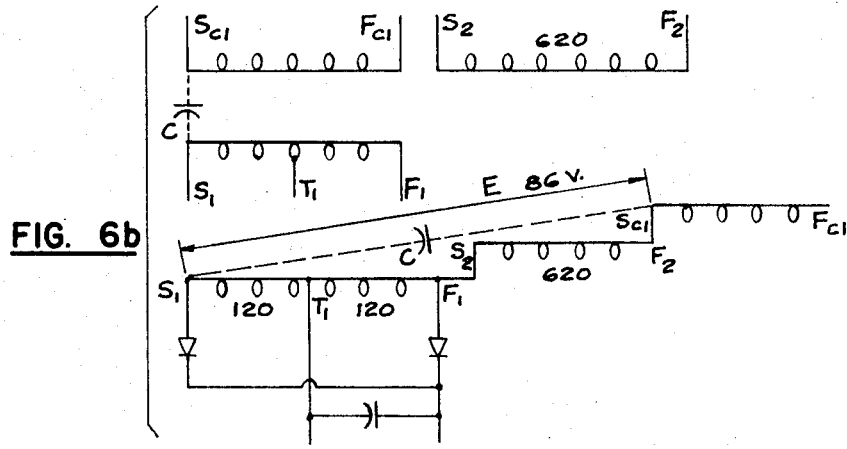
Figure 6C:
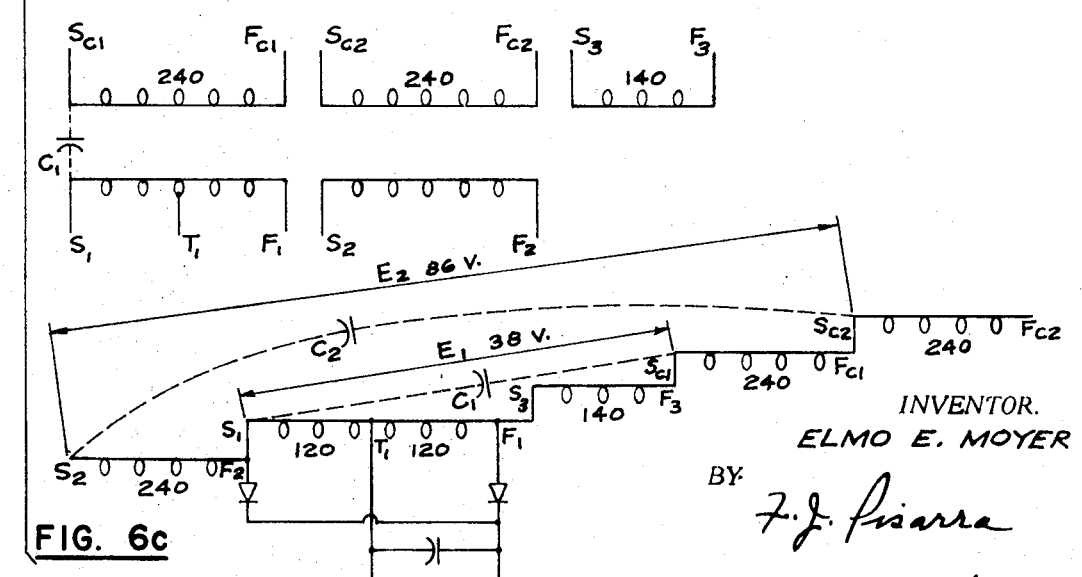
Figure 7A:
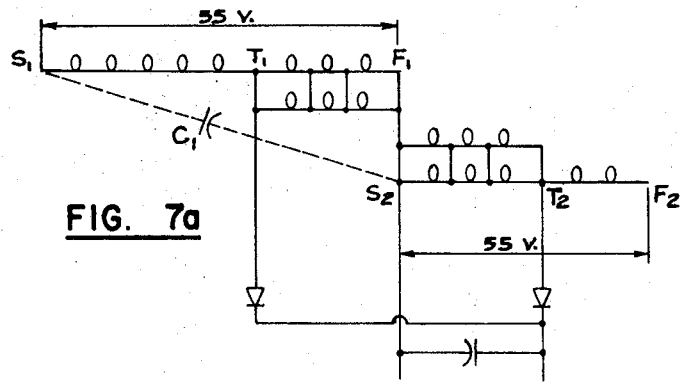
Figure 8:
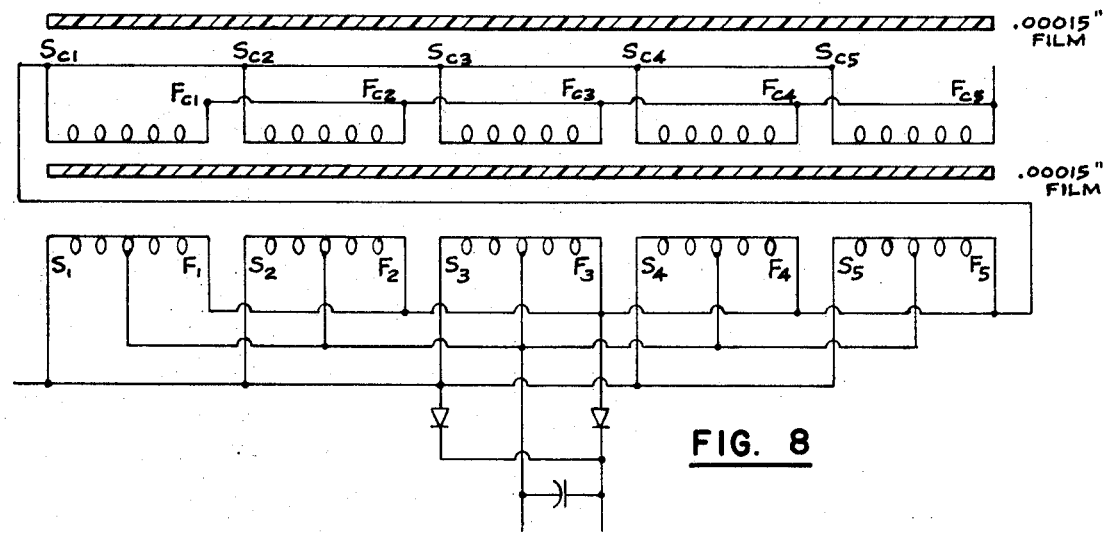
Figure 9:
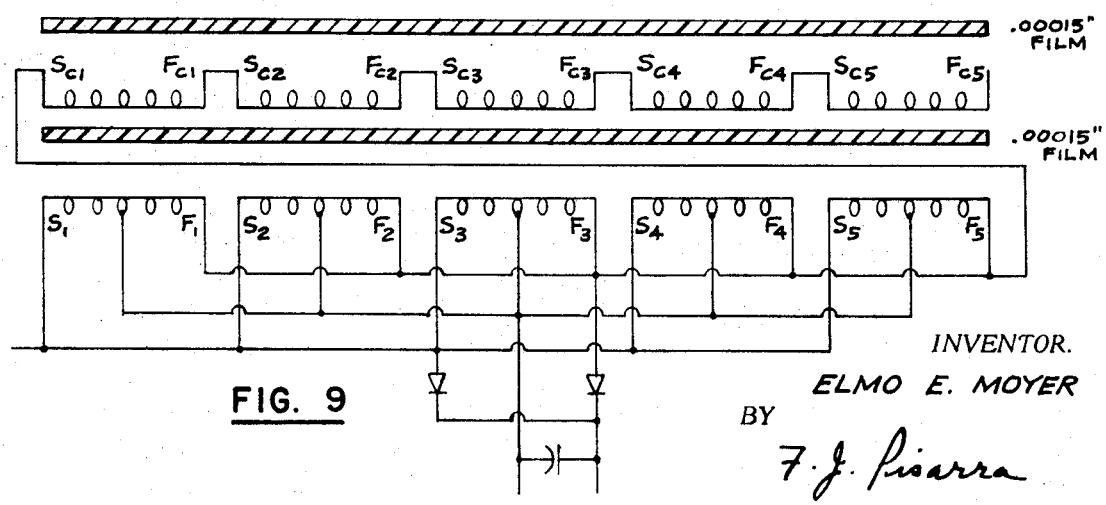
Figure 8A:
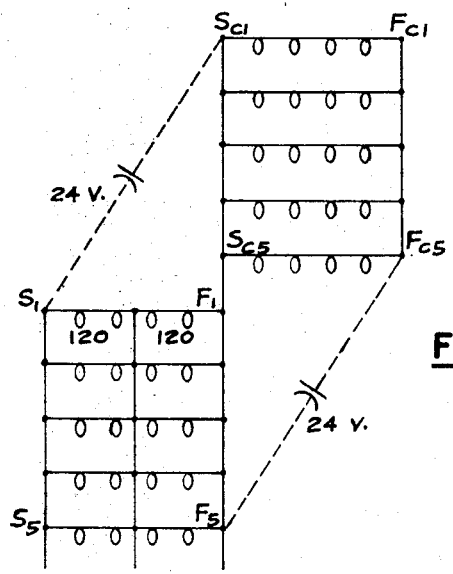
Figure 9A:
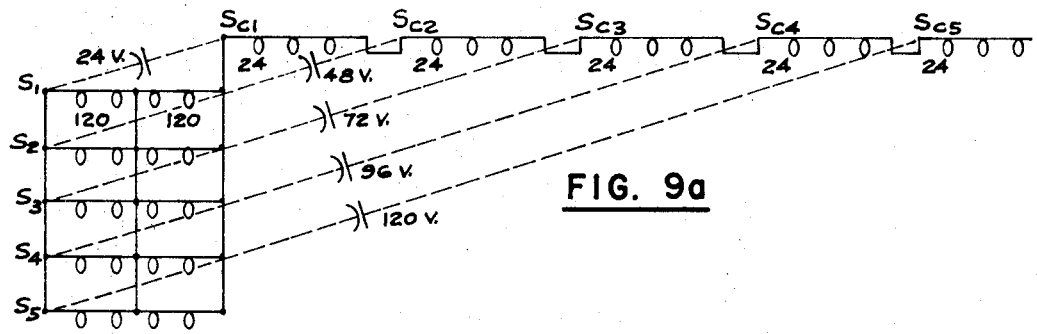
Figure 10:
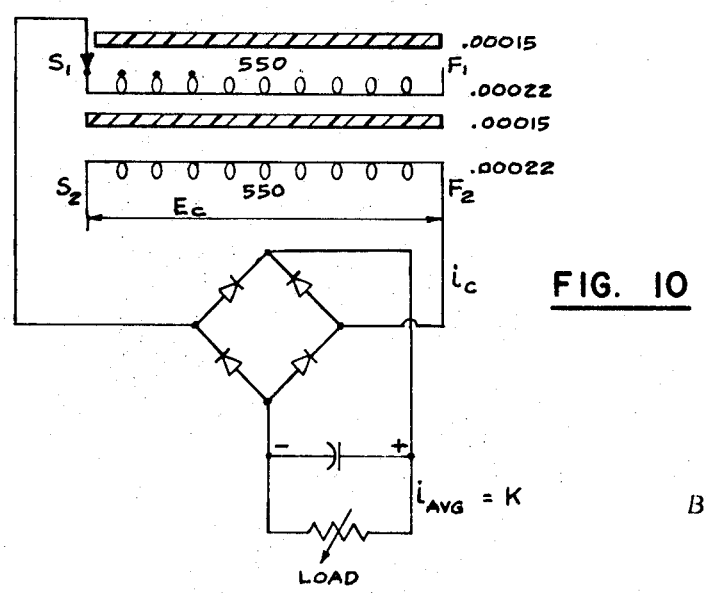

FIG. 6a, 6b, and 6c show variations of FIG. 6 in which the coils are sectionalized and differently interconnected to provide successively increasing amounts of stored energy;

FIG. 7 is a further variation of FIG. 6;

FIG. 7a is a view based on FIG. 7 but more clearly indicating the capacitance established as the result of the windings' interconnections;

FIG. 8 is a schematic wiring diagram indicating a type of coil construction that may be imposed by the mechanical limitations of certain types of automatic foil winding machines, and in which both sets of windings are parallel connected;

FIG. 8a is based on FIG. 8 but more clearly indicating the capacitance voltages established as the result of the windings' interconnections;

FIG. 9 is a variation of FIG. 8 in which the capacitance foil windings are series connected and the load foil windings are parallel connected;

FIG. 9a is based on FIG. 9 but more clearly indicating the capacitance voltages established as the result of the windings' interconnections; and FIG. 10 is a schematic wiring diagram showing how this device readily may be adapted for a constant current rather than a constant voltage output.

Figure 1:
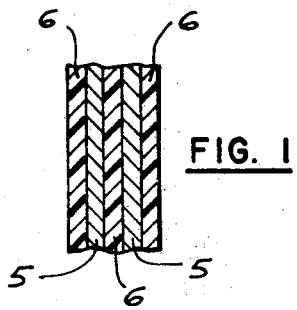
FIG. 1 is a fragmentary vertical section of a coil for a typical ferroresonant device constructed in accordance with this invention and shows the use of turns of metal foil interleaved with corresponding turns of dielectric film.

Referring to the drawings in detail, it will be understood that the various embodiments of the invention are incorporated in ferroresonant stabilizers, the coils of which (see FIG. 1) are formed from multiple windings of aluminum or other metallic foil 5 interleaved with separation windings of a dielectric film 6 such as "Mylar," over a saturable magnetic core generally provided with a magnetic shunt between primary and secondary windings.

The means by which a difference in potential is established between adjacent foil turns or windings will be referred to as "electrical shear" since that term seems best to describe the effect in a physical sense.

Figure 2:
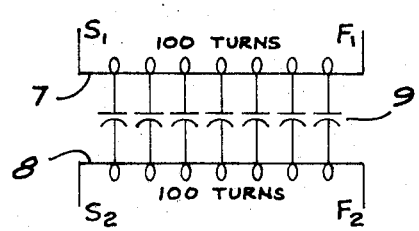
FIG. 2 is a schematic wiring diagram illustrating the means by which a difference in potential is established along adjacent foils.

To illustrate (see FIG. 2), consider the adjacent foils in 100 turn coil windings 7 and 8 in which $S_1$ and $F_1$ respectively designate the start and finish of the coil winding 7 and $S_2$ and $F_2$ the start and finish of the coil winding 8. Then, let the voltage induced from the primary flux change by 1 volt RMS per turn. Capacitance 9 will exist between each turn of the adjacent foil windings 7 and 8 and will be accumulative throughout the full 100 turns in an amount determined by the exposed area of foil per turn, the thickness of the interleaved dielectric film 6 and the dielectric constant of the film.

Figure 3:
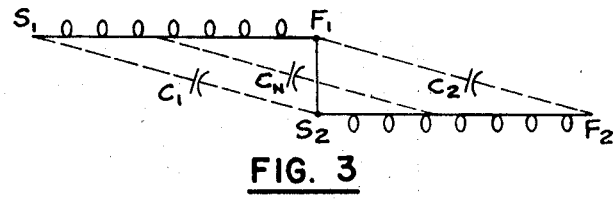
FIG. 3 is a similar schematic wiring diagram showing the connection for effecting the "electrical shear" displacement of one coil with respect to the other.

So far there is no voltage across any increment of capacitance because the opposite faces of the foils are at the same potential measured from a given point such as $S_1$ to $S_2$. In other words, when a potential is accumulated on one foil from $S_1$ to an $N_1$th turn approaching $F_1$, the identical potential is accumulated on the other foil from $S_2$ to its $N_2$th turn, so there can be no difference of potential between the adjacent foils throughout the full 100 turns thereof. However, if as shown in FIG. 3, $F_1$ is connected conductively to $S_2$ one winding is displaced (in an electrical sense) relative to the other.

Now, the 100 volt RMS difference of potential across the 100 turns between $S_1$ and $F_1$ has displaced $S_2$ relative to $S_1$ by the amount of 100 volts RMS and has displaced any pair of opposite points such as $N_1$ and $N_2$ by the same amount of 100 volts RMS. Accordingly, the elemental capacitance $C_1$ between the first turns of the adjacent foils is experiencing a difference of potential of 100 volts RMS, as are all similar capacitances $C_N$ through and including $C_2$ between $F_1$ and $F_2$.

Figure 4:
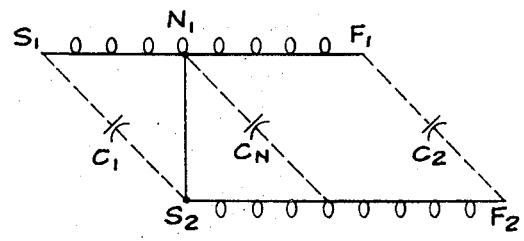
FIG. 4 is a similar schematic wiring diagram showing a variation in the conducting connection between the two foils when the thickness of the interleaved dielectric film therebetween is not suited to the predetermined electrical stress.
Figure 5:
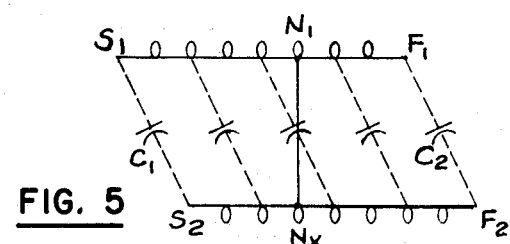
FIG. 5 is a variation of FIG. 4.

In the event that the thickness of the interleaved dielectric film is not suited to an electrical stress of 100 volts RMS, yet it is still desired to have 100 volts RMS induced along the length of each foil, the conducting connection of the two foils, which produces the electrical shear and its capacitive voltage, may be made at an intermediate point such as $N_1$ (see FIG. 4) on one foil, in which case the electrical stress on the capacitance elements will be the voltage $S_1$ to $N_1$. The conducting connection of the two foils also could be made between intermediate points such as $N_1$ to $N_X$ (see FIG. 5) in which case the capacitance voltage will be that of $S_1$ to $N_1$ minus $S_2$ to $N_X$ or $N_X$ to $F_2$ minus $F_1$ to $N_1$.

From the foregoing it will be understood that a load could be conductively connected, for example, at selected points such as $S_1$ and $F_1$, $S_1$ and $N_1$, $S_2$ and $F_2$ or $N_1$ and $F_2$ just as though the series windings $S_1$ to $F_2$ were the one winding of a transformer. In so far as concerns the primary flux which links the foil windings $S_1$, $F_1$ and $S_2$ $F_2$, the secondary circuit looks like a winding voltage of E =100 volts RMS supplying a capacitance of $C_{TOT}$ mfds. This coupling of capacitance is more effective than when the capacitance is supplied externally of the transformer because each increment of capacitance is coupled to an increment of the flux-changing voltage-inducing section of the transformer, with the added feature that capacitive current does not have to flow through the resistance of a separate winding which would produce RI² losses therein.

Obviously, in these constructions the foil and film thicknesses, the number and sequence of windings, and the various coil connections will be designed for each specifically required end use. However, in those cases where only a portion of one foil is used as a load section, only that one portion need be of relatively heavy foil with the remainder being of lighter foil commensurate with the capacitive current to be carried. FIG. 6 is illustrative of this, and it will be observed that the $S_1$ to $F_1$ windings consist of 550 turns of 0.00022 inch aluminum foil; the interleaved dielectric is 0.00015 inch "-Mylar" film; and the $S_2$ to $F_2$ windings consist of 550 turns of 0.00022 aluminum foil with the first 240 turns thereof reinforced with 240 turns of 0.00035 inch aluminum foil in intimate contact therewith. The dielectric film is stressed at about 55 volts which corresponds to about 0.1 volt RMS per turn of foil.

In this construction it is advantageous to make the "electrical shear" connection from $S_1$ to $F_2$ because the capacitive current distribution along the length of a foil is at a maximum at the points connection $S_1$ and $F_2$ and tapers off to zero at the opposite ends $F_1$ and $S_2$. Since the reinforced end adjacent $S_2$ is also conducting load current, it is proper to make this end the end of minimal capacitive current.

In very much optimized designs it may be desirable to grade the thickness of capacitive foils by laminating different lengths of foil, of the same thickness or different thickness of material so that the thinnest cross section is at the end section of least capacitive current and the thickness increases in steps through sections carrying greater accumulated current until the thickest section is at the terminal end where total current enters or leaves.

In the construction of FIG. 6 the stored energy may be indicated by the equation $CE^2$ in which C is proportional to the number of turns (550) and E is 55 volts (0.1 volts per turn), thus giving a value of 1,663,750 units.

The stored energy of the general FIG. 6 construction may be varied and/or increased by winding the coils in sections and interconnecting the sections in different ways.

Thus in FIG. 6a the capacitance winding $S_1$, $F_1$ of FIG. 6 has been separated into two sections $S_1$, $F_1$ of 240 turns and $S_3$, $F_3$ of 310 turns, while the load winding $S_2$, $F_2$ of FIG. 6 has been separated into two sections, the first of which is the dual load winding $S_2$, $T_2$, $F_2$ totaling 240 turns and the second of which is a capacitance winding $S_4$, $F_4$ of 310 turns. In this variation a capacitance $C_1$ is established between $S_1$ and $S_2$ and a capacitance $C_2$ is established between $S_3$ and $S_4$. Here $H_1$ is 24 volts and $E_2$ is 79 volts so that the total stored energy is $$C_1E_1^2 = 240(24)^2 = 138{,}290 + C_2E_2^2 = 310(79)^2 = \frac{1{,}562{,}710}{1{,}700{,}950}$$

units which is somewhat greater than that for Fig. 6.

FIG. 6b shows a further variation in which the capacitance winding $S_1$, $F_1$ of FIG. 6 has been separated into a capacitance section $S_{C1}$, $F_{C1}$ of 240 turns and a free section $S_2$, $F_2$ of 620 turns, while the load winding $S_2$, $F_2$ of FIG. 6 has been reduced to only the dual load windings $S_1$, $T_1$, $F_1$ totaling 240 turns. In this variation a capacitance C is established between $S_1$ and $S_{C1}$ and E is 88 volts so that the stored energy value $CE^2$, is 240 $(86)^2$ ax 1,775,040 units.

FIG. 6c shows a further variation in which the capacitance winding of FIG. 6 has been separated into a first capacitance section $S_{C1}$, $F_{C1}$ of 240 turns, a second capacitance section $S_{C2}$, $F_{C2}$ of 240 turns and a free section $S_3$, $F_3$, while the load winding $S_2$, $F_2$ of FIG. 6 has been changed to a dual load winding $S_1$, $T_1$, $F_1$ totaling 240 turns and a second load winding $S_2$, $F_2$ of 240 turns. In this variation a capacitance $C_1$ is established between $S_1$ and $S_{C1}$ and a capacitance $C_2$ is established between $S_2$ and $S_{C2}$. Here $E_1$ is 38 volts and $E_2$ is 86 volts so that the total stored energy is $$C_1E_1^2 = 240(38)^2 = 546{,}560 + C_2E_2^2 = 240(86)^2 = \frac{1{,}775{,}040}{2{,}321{,}600}$$

units which is substantially greater than that for Fig. 6.

FIG. 7 of the drawings shows a modification of the construction of FIG. 6 that may be used where the load is to be a center-tapped rectifier. In this modification the windings $S_1$ to $F_1$ are reinforced by additional foil from $T_1$ to $F_1$; the windings $S_2$ to $F_2$ are reinforced by additional foil from $S_2$ to $T_2$; and the "electrical shear" connection is made from $F_1$ to $S_2$. This connection is simplified in FIG. 7a.

In these descriptions, for simplicity, it has been assumed that, in a foil-wound coil of appreciable buildup, the capacitance is proportional to the number of turns. In a practical sense this is not exactly so because the length of an inner turn is appreciably shorter than the length of an outer turn and if the foil width is constant, the area of an inner turn is less than the area of an outer turn. Hence, a coil split into one section of 240 bifilar wraps and another section of 310 wraps (as per FIG. 6a) will have capacitance values more in the order of $C_{240}$=7 mfds and $C_{310}$=11 mfds, whereas a direct proportion based on 240 wraps yielding 7 mfds would have given 310 wraps a capacitance value of only 9 mfds.

It is desirable, usually, to make the load section of foil an inner section to keep the resistance per turn to a minimum; fortuitously, this leaves the outer section for capacitance in a region where the greater length of turn gives the most capacitance per turn or section of turns. Whenever possible the inner sections of lower capacitance and lower operating voltage should be used to voltage boost or spread the potential difference between the foils of the outer section which has the greater capacitance so that the $CE^2$ value will be greater, if this is what is desired.

In view of the mechanical limitations of some types of automatic foil winding machines it may be necessary to wind a plurality of separate sections of coils of the general nature of those shown in FIGS. 6 and 7.

FIG. 8 of the drawings shows one practical approach for this in which the windings are in five separate sections of 120 turns each with all of the foil windings being made from 0.00022 inch aluminum foil and the interleaved dielectric being of 0.00015 inch "Mylar" film. In this instance both the load and capacitance windings are parallel connected; the "electrical shear" connection is made from the $S_{C1}$ bus to the $F_5$ bus; and the dielectric stress is only the voltage of one section of 120 turns, which, at 0.1 volt per turn would be 12 volts. In this construction the capacitance windings are from $S_{C1}$, $F_{C1}$ through $S_{C5}$, $F_{C5}$ and the load windings are from $S_1$, $F_1$ through $S_5$, $F_5$. FIG. 8a indicates the establishment of capacitances between $S_{C1}$, $S_1$ and $F_{C5}$, $F_5$. Here the stored energy is represented by the formula $5[C(24)^2]$.

The stored energy may be increased elevenfold over that of FIGS. 8 and 8a by having the capacitance windings $S_{C1}$, $F_{C1}$ through $S_{C5}$, $F_{C5}$ connected in series and the load windings $S_1$, $F_1$ through $S_5$, $F_5$ parallel connected (see FIGS. 9 and 9a). In this direction the "electrical shear" connection is again made from the $S_{C1}$ bus to the $F_5$ bus. Here the E values increase by 24 volts increments from $E_1$=24 volts to $E_5$=120 volts so that the stored energy is represented by the formula $(1+4+9+16+25)[C(24)^2]$ which is 11 times that obtained through the interconnections of FIG. 8.

The construction of FIG. 6 readily may be converted for low voltage, high current, application simply by changing the two 120 turn reinforced tapped load windings to said 10 sets of parallel connected, center-tapped windings of 24 turns per set to provide a load connection of 1.2 volts at 10 times current.

It is believed that, in accordance with this invention, the improved electrical efficiency is brought about by substantially eliminating the internal $I^2R$ losses inherent in the "resonant" winding of conventionally designed power units employing external "resonant" capacitance.

In conventional designs, with a "resonant" winding to supply the external "resonant" capacitance, the VA rating, $E_{RMS} \times I_{RMS}$, of the capacitive circuit is about twice the DC output, $E_{AVG} \times I_{AVG}$. If the load winding supplying the DC output is a separate winding (not autotransformer connected to the "resonant" winding) it would have a total resistance $r$ commensurate with the RMS current to be handled so that the internal losses of this winding alone would be $rI^2$. Assuming that the same proportion of losses occur in the "resonant" windings as in the load windings, and that both windings are of the same voltage rating, the "resonant" windings would be handled twice the current, would be wound of a conductor having twice the cross-sectional area and half the resistance $r/2$ so that its losses would be $r/2(2I)^2$. Twice the cross section area of the same number of turns means that this "resonant" winding would occupy twice the window space of the load winding or two-thirds the window space of both windings. Total losses now become $3(rI^2)$ and these have to be supplied by a primary winding, possibly of equal loss content, making a total loss of $6(rI^2)$.

Therefore, if the "resonant" winding be eliminated entirely and capacitance foil, with the same capacitive losses wound in its place, as in this invention, there would be a saving of losses of $2rI^2$ in the secondary and $2rI^2$ in the primary, saving $r4I^2$ out of the total $6rI^2$ thus clearly showing the increased efficiency of this integrated unit.

Furthermore, comparative tests show that, for comparable output VA characteristics, the integrated unit of this invention needs only about two-thirds as much capacitance as a conventionally designed unit with separate external capacitance. This enables a substantial reduction in the weight and size of the unit of this invention since less window space is required and the comparative weight of this unit need by only about one-half that of the conventional unit with its external capacitance.

Although the description of this invention thus far has been directed to integrated stabilizers for constant voltage outputs, it should be mentioned that the same constructions readily can be adapted for constant current outputs. FIG. 10, which is based on FIG. 6, is illustrative, and shows that the load connection is made from a rectifier interposed in the "electrical shear" connection $S_1$, $F_2$ rather than from the load windings $S_2$, $F_2$. In this constant current arrangement $$i_c = \frac{E_c}{X_c}$$

and to change $i_c$, and hence $i_{AVG}$ at the output, either or both of $E_c$ or $X_c$ are changed. Preferably the $S_1$, $F_1$ windings are tapped so that the "electric shear" connection from $F_2$ may be varied in its position of conductive contact with the $S_1$, $F_1$ windings.

If discreet steps of adjustment of the constant current level is permissible (instead of a continuously variable adjustment) the capacitance could be wound in sections and interconnected in series, parallel, series parallel and/or various combinations of voltage boosting (or voltage bucking) as for example FIG. 6c.

I claim:

1. In an integrated ferroresonant stabilizer having a regulated constant voltage output, a magnetic core, a secondary coil wound around said core and comprising a multiplicity of capacitance windings formed from a continuous length of conductive foil and a multiplicity of load windings formed from a continuous length of conductive foil, each turn of said capacitance winding being adjacent a corresponding turn of said load winding and separated therefrom by a continuous length of dielectric film interleaved therebetween, said capacitance and said load windings being connected in "electrical shear," the first plurality of turns of said multiplicity of turns of said load windings being reinforced by a similar plurality of turns of a continuous length of conductive foil in intimate contact with the foil of said load windings, and a rectified load connection extending from preselected tap locations on said load windings, the taps for said load connection being located within the limits of the reinforced portion of said load windings.

2. The integrated stabilizer of claim 1 in which said capacitance windings are formed as a plurality of parallel connected sections and said load windings are formed as a plurality of parallel connected sections equal in number to the sections of said capacitance windings.

3. The integrated stabilizer of claim 1 in which said capacitance windings are formed as a plurality of series connected sections and said load windings are formed as a plurality of parallel connected sections equal in number to the sections of said capacitance windings.

4. The integrated stabilizer of claim 1 in which said capacitance windings are formed in a plurality of disconnected sections of a predetermined number of turns and said load windings are formed of at least one section corresponding to a section of said capacitance windings and having the same number of turns as those is said corresponding capacitance section.